United States Patent [19]
Schulz et al.

[11] Patent Number: 5,456,454
[45] Date of Patent: Oct. 10, 1995

[54] SUPPORT BEARING FOR AUTOMOTIVE VEHICLES

[75] Inventors: Walter Schulz, Stuttgart; Hans-Rudolf Steinert, Wendlingen; Horst Swinnen, Wolfschlugen; Peter Fritz, Stuttgart, all of Germany

[73] Assignee: Mercedes-Benz AG, Stuttgart, Germany

[21] Appl. No.: 317,541

[22] Filed: Oct. 4, 1994

Related U.S. Application Data

[63] Continuation-in-part of Ser. No. 261,898, Jun. 15, 1994, abandoned.

[30] Foreign Application Priority Data

Jun. 15, 1993 [DE] Germany .......................... 43 19 689.6

[51] Int. Cl.$^6$ .............................. B60G 13/08; F16F 1/36
[52] U.S. Cl. .................... 267/293; 188/321.11; 267/141; 267/153; 267/220; 267/294; 280/673
[58] Field of Search ...................... 267/220, 219, 267/221, 292, 293, 294, 153, 141, 141.1, 141.7, 141.4, 33, 141.5, 139, 140; 280/673, 668, 716; 248/632, 633, 634, 635; 188/321.11

[56] References Cited

U.S. PATENT DOCUMENTS 2,774,485  12/1956  Danielson .
4,025,063   5/1977  Willison .
4,968,010  11/1990  Odobasic ............................... 267/294

FOREIGN PATENT DOCUMENTS 1427635   1/1966  France .
3106690   9/1982  Germany .
3919775  10/1990  Germany .

*Primary Examiner*—Douglas C. Butler
*Attorney, Agent, or Firm*—Evenson, McKeown, Edwards & Lenahan

[57] ABSTRACT

A support bearing supporting a shock absorber piston rod at a vehicle frame part is disclosed which includes cup-shaped receptacles attached to both sides of the frame part. Elastic support elements are clamped into the receptacles between respective sides of the frame part and stops on a piston rod extending through the receptacles frame part and elastic support elements. To aid in centering the elastic support elements in the receptacles, ribs are provided on one of the elastic elements and the receptacles side walls, such that no other centering attachment of the elastic elements to the receptacles such as by vulcanization, is required.

26 Claims, 5 Drawing Sheets

SUPPORT BEARING FOR AUTOMOTIVE VEHICLES

BACKGROUND AND SUMMARY OF THE INVENTION

This is a continuation-in-part application of application Ser. No. 08/261,898, filed on Jun. 15, 1994, now abandoned.

This invention deals with an elastic support bearing assembly for automotive vehicles, such as for mounting a shock absorber piston rod at a relatively fixed vehicle frame part and including elastic elements at each side of the frame part.

Support bearings of this general type have been known from the German Patent Document DE 39 19 775 C1.

In such support bearings, a neutral position is determined by the initial stress of the elastic support elements within the mounting frame, and consequently an efficient guide of the element, which is supported via the bearing with respect to the supporting structure, is also secured. Starting with this fact, first a flat characteristic curve results during the further path of the stroke with the load increase, until, due to deformation, the elastic support elements quasi fill the cup-shaped receiving parts upon increasing load. When this condition has been achieved, there is a progressive increase of the characteristic spring curve, which is a progressive stiffening, until, for example, the stops on the support rod side for the spring elements rest on the rims of the cup-shaped receivers, and thus, a quasi rigid connection in the direction of the support occurs. Based on the fact that the elastic annular cylindrical support elements closed upon themselves are fixed in the cup-shaped receivers, despite the radially remaining clearance with respect to the cup walls, there is provided a radial guide in the cups so that, with respect to the structural position, a sufficient radial guide of the support rod in the support bearing is guaranteed.

In prior art arrangements, with fixation of the elastic elements by means of vulcanization, a considerable production expense is incurred.

An object of the invention is to provide a more economical to produce and simple bearing assembly than is presently available.

In preferred embodiments of the invention, arrangement is provided wherein the radial support of the elastic support elements is by means of individual support ribs, which rest against the cup walls or which also can be formed out of the cup walls. This provides a very simple solution with respect to production and mounting, as well as spare part maintenance. This also dispenses with the need for vulcanization or other attachment of the elastic support elements.

In certain preferred embodiments, the elastic support elements include integrally formed caps which prevent contamination of the radial space between the elastic support elements and the cup walls.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
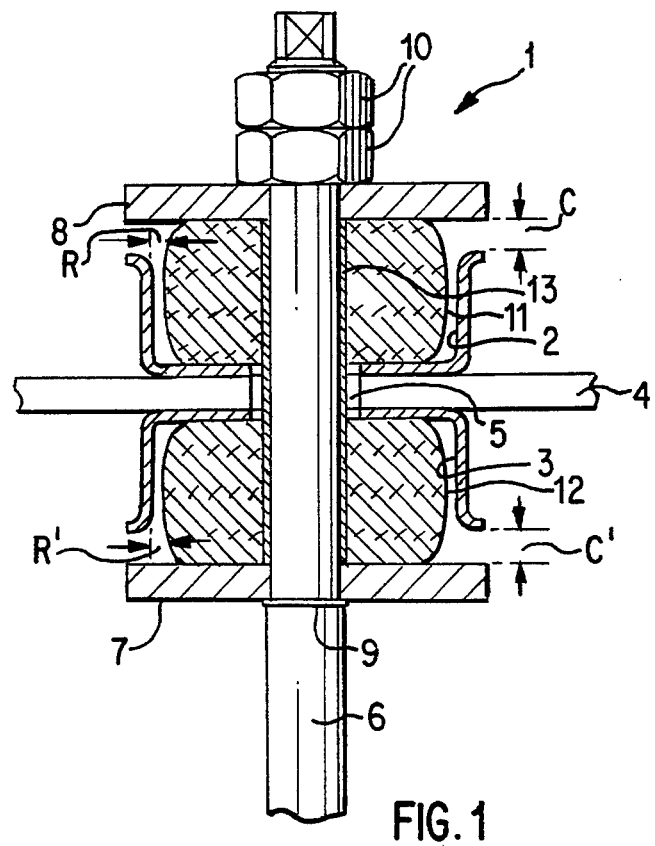
FIG. 1 shows a section through a support bearing assembly constructed according to a preferred embodiment of the present invention, in a structural position with a support rod such as a piston rod of a shock absorber fixed in position with respect to an automotive body via the support bearing by means of preloading of elastic elements.

The support bearing 1 comprises, in the illustrated form of the embodiments of FIGS. 1–6, two cup-shaped receptacles 2,3 which are arranged at opposite sides of a central receiving opening 5 of a vehicle body frame support part 4. In a preferred embodiment, the support member is a steel member. The cup-shaped receptacles 2,3 are fixed with respect to the support part 4 and, with respect to the support part 4 are open towards opposite directions. The receiving opening 5 is penetrated by a support rod 6, which, for example, can be a piston rod of a shock absorber or similar device, which is not further illustrated. The diameter of the support rod 6 is so designed that the latter penetrates the receiving opening 5 with a radial clearance so that there is free movement of the support rod with respect to the receiving opening in the axial as well as, within limits, in the radial direction, and consequently an angular movability of the support rod 6 is provided for.

On the support rod 6, stops 7,8 are provided, which, in the present example are formed by disks which are fixed with respect to the support rod, wherein the stop disk 7 rests against a flange 9 of the support rod 6 and the stop disk 8 rests against counter nuts 10.

Between the stops 7,8 and each of the associated cup-shaped receptacles 2,3, there are provided elastic support elements 11,12, each of which comprises a closed upon itself annular, essentially cylindrical rubber body or other elastomeric body. The distance between the disk-shaped stops 7 and 8 is preset by a sleeve 13 which is around the support rod 6, wherein the length of this sleeve 13 is so chosen that, with reference to the shown assembled position, the elastic support elements 11,12 are preloaded.

In this preloaded initial mounted position of the elastic support elements 11,12, an open clearance C, C' is provided between the disk-shaped stops 7,8 and the upper open rim of each of the cup-shaped receptacles 2,3 so that, corresponding to the forces to be absorbed, the elastic support elements 11,12 can be compressed and that is, at maximum, up until the disk-shaped stop 7, or alternatively the stop 8, being in covering position over the open cup rims, rests against the respective cup rim and thus form a rigid connection between the support rod 6 and the support part 4, depending on the respective direction of the load.

Figure 2:
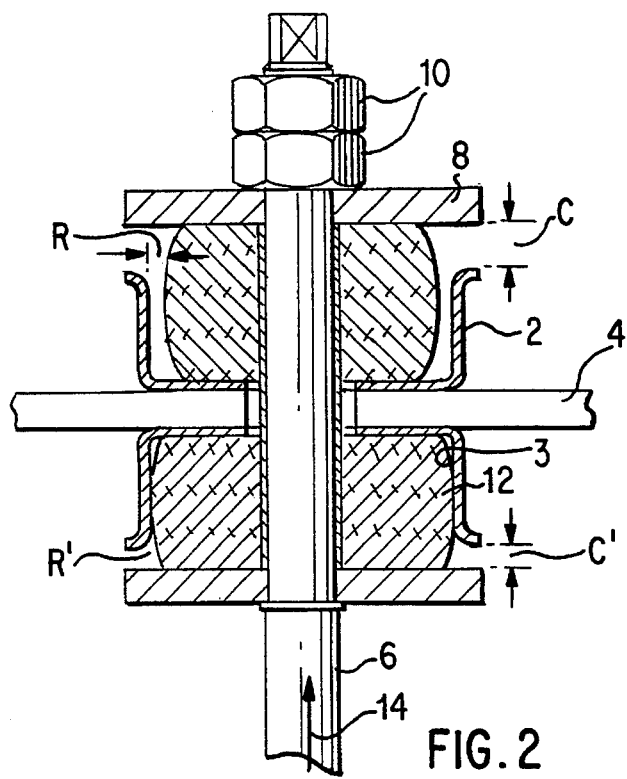
FIG. 2 is a sectional view of the support bearing assembly of FIG. 1 shown in a condition with a small one-sided load on the bearing.

In the illustrated structural position shown in FIG. 1, despite the preload of the elastic support elements 11,12, a radial clearance R, R' is provided between them and the walls of the cup-shaped receptacles 2,3 so that, upon applying a load, (compare FIGS. 2,3) the elastic support elements, in this case the support element 12, first are deformed sufficiently that the radial clearance space of the cup 3 is quasi or partly filled (FIG. 2). If the load is increased, the elastic element 12 (FIG. 3) is now compressed further to close the radial clearance space which results in a progressive stiffening over the load path, as can be seen from FIG. 7.

Figure 7:
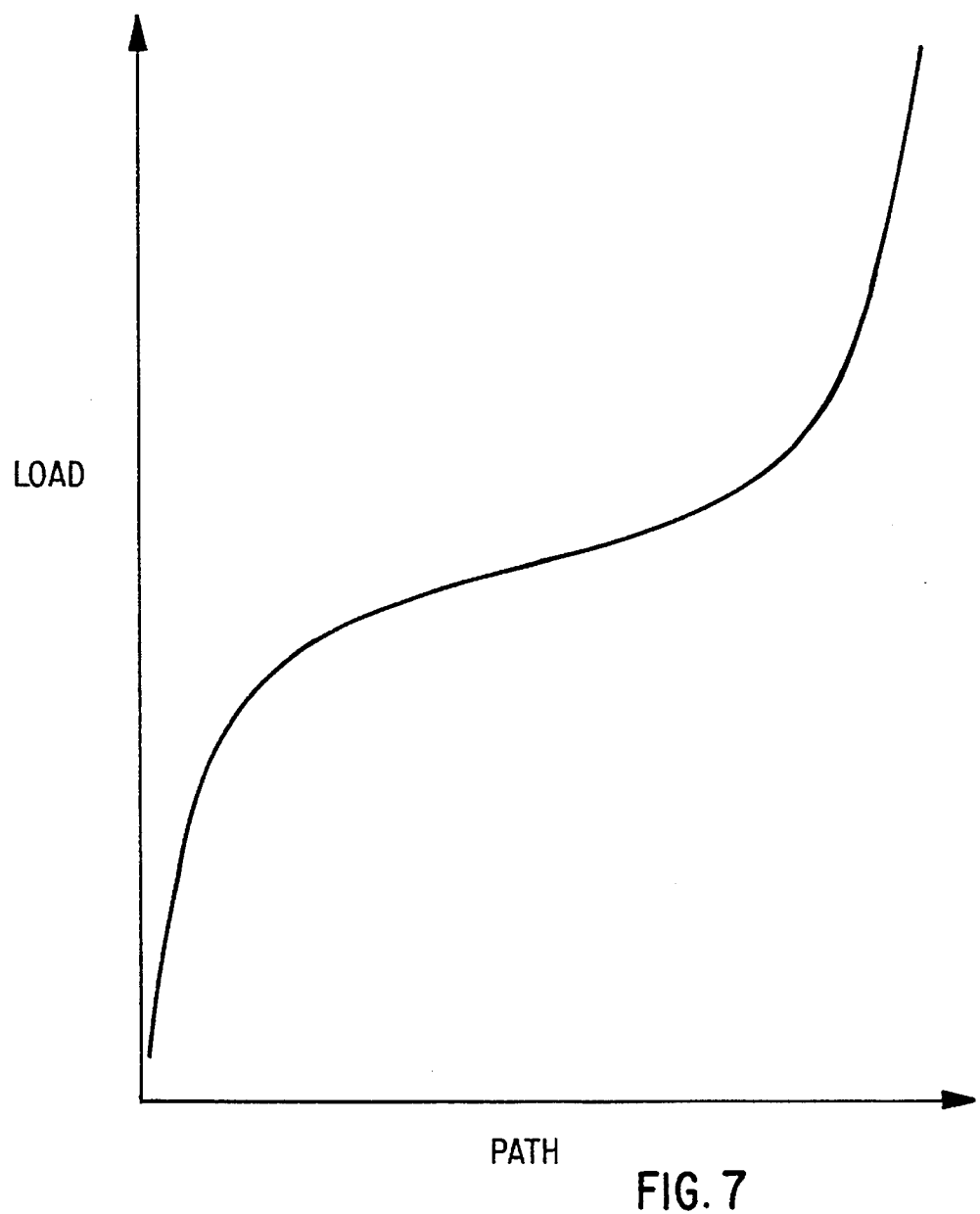
FIG. 7 is a diagram showing the course of the support load versus the path in a support bearing constructed according to present invention.

Thus the support element is, as shown in FIG. 7, relatively soft around the neutral position which corresponds to the preloaded position shown in FIG. 1, and the desired stiffening occurs, as shown in FIG. 2, as soon as the respective cup-shaped receptacle, in this case the receptacle 3, is quasi filled by the elastic element so that, upon a further load being applied in the direction of the arrow 14, the elastic support element now must be compressed into the preset volume of the cup-shaped receptacle 3.

The maximum displacement in the direction of the arrow is determined by the covering position between the respective stop, in this case the disk-shaped stop 7, and the open rim of the respective wall of the cup, in this case the cup-shaped receptacle 3.

Figure 3:
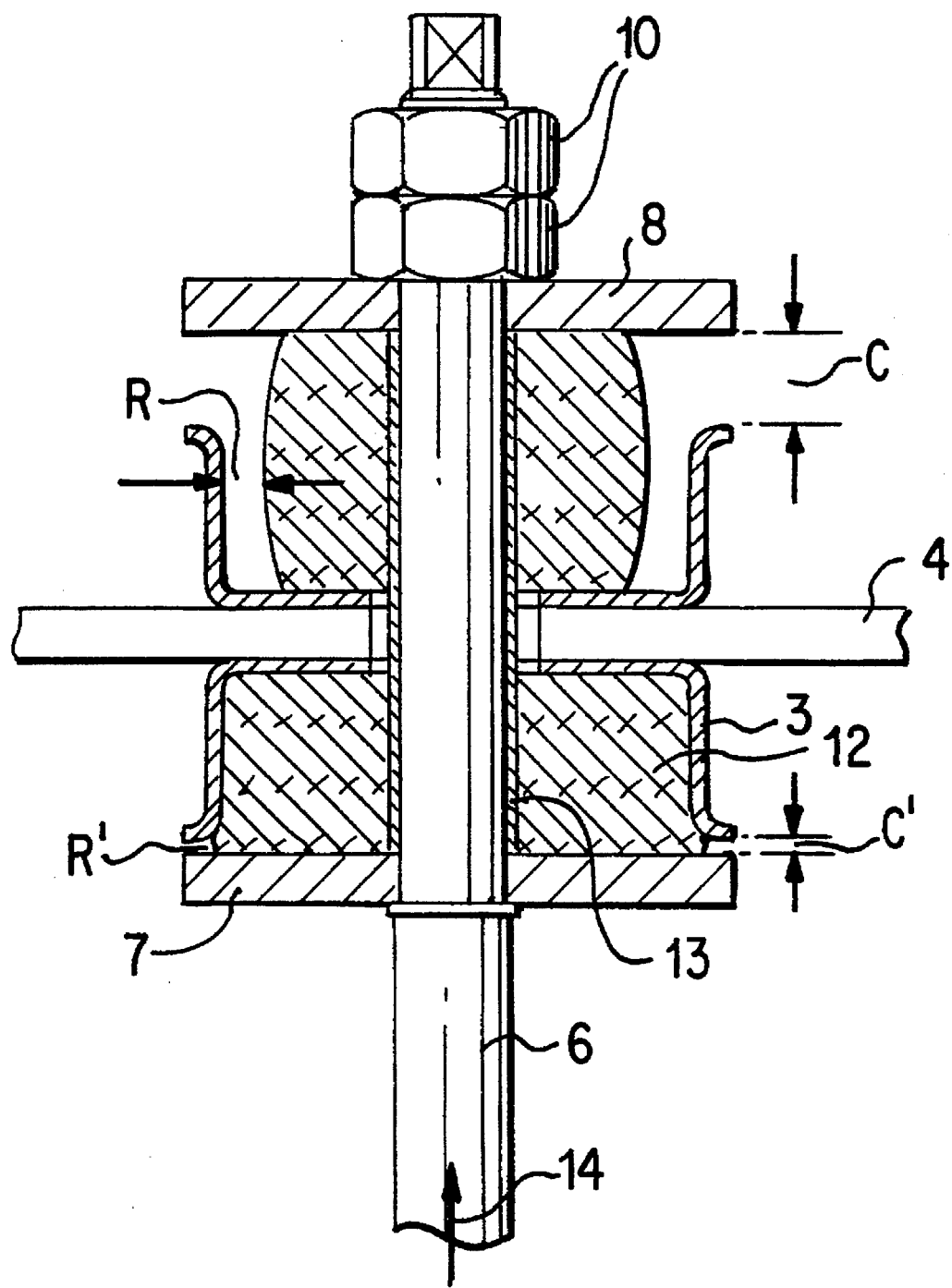
FIG. 3 is a view similar to FIG. 2, shown with a stronger one-sided load on the bearing.

FIGS. 4a to 6 show embodiment possibilities for centering the elastic support elements within the cup-shaped receptacles, this centering being necessary, in order to secure the desired radial clearance between the circumference of the respective elastic support element and the cup-shaped receptacle in the structural position. Therefore, in each section, the upper, cup-shaped receptacle 2, with the associated elastic support element 11, is essentially as illustrated in FIG. 1, and wherein, with additional different characterizing letters, corresponding reference numbers as in FIGS. 1–3 are used in connection with the shown variations.

Figure 4A:
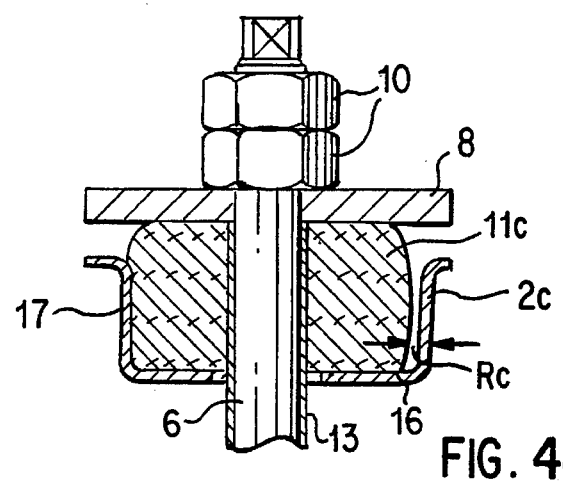
FIGS. 4a, 4b, 5a, 5b and 6 show different embodiments for centering the elastic support elements within the cup-shaped receptacles of the bearing assembly of FIGS. 1–3.
Figure 4B:
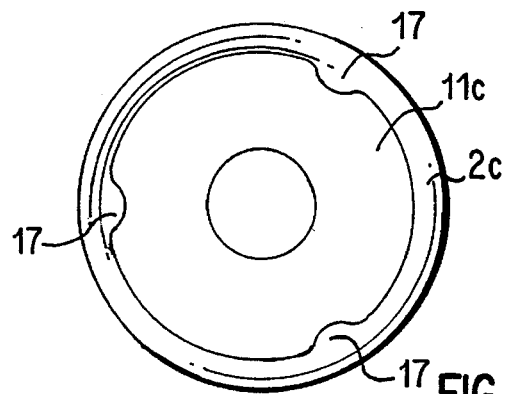

In the type of the embodiment according to FIGS. 4 and 4b, from the plan view of FIG. 4b, a cup-shaped receptacle 2c is provided, wherein, around the circumference of the cup-shaped element, individual support ribs, in this case three support ribs 17, extend in the height direction of the wall of the cup-shaped receptacle 2c. The support ribs effect, as it is shown in the illustration on the left side in FIG. 4a, a partial guide of the elastic support element 11c so that, over the largest part of the circumference, a compression clearance RC is provided, as it is shown schematically in FIGS. 4a and 4b on the right side of the illustrated section.

Figure 5A:
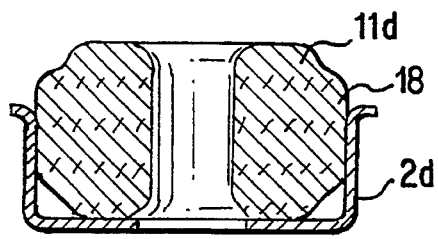
Figure 5B:
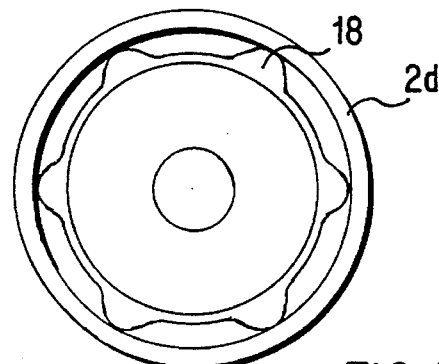

FIG. 5a along with plan view of 5b shows another variation, wherein, with a design of the cup-shaped receptacle 2d according to FIG. 1. the elastic support element 11d is provided with support ribs 18 around its circumference, which extend over a portion of the height of the elastic support element, and that is preferably over its center portion so that above and below the support ribs 18, compression clearances still remain within the cup-shaped receptacle 2d.

Figure 6:
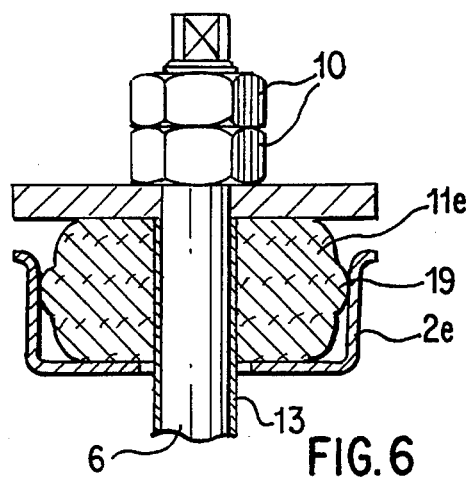

In the type of the embodiment according to FIG. 6, the elastic support element 11e is provided with a support rib 19 extending around the circumference which is preferably located at about the medium height area of the elastic support element 11e and consequently within the cup-shaped receptacle 2e.

Figure 8:
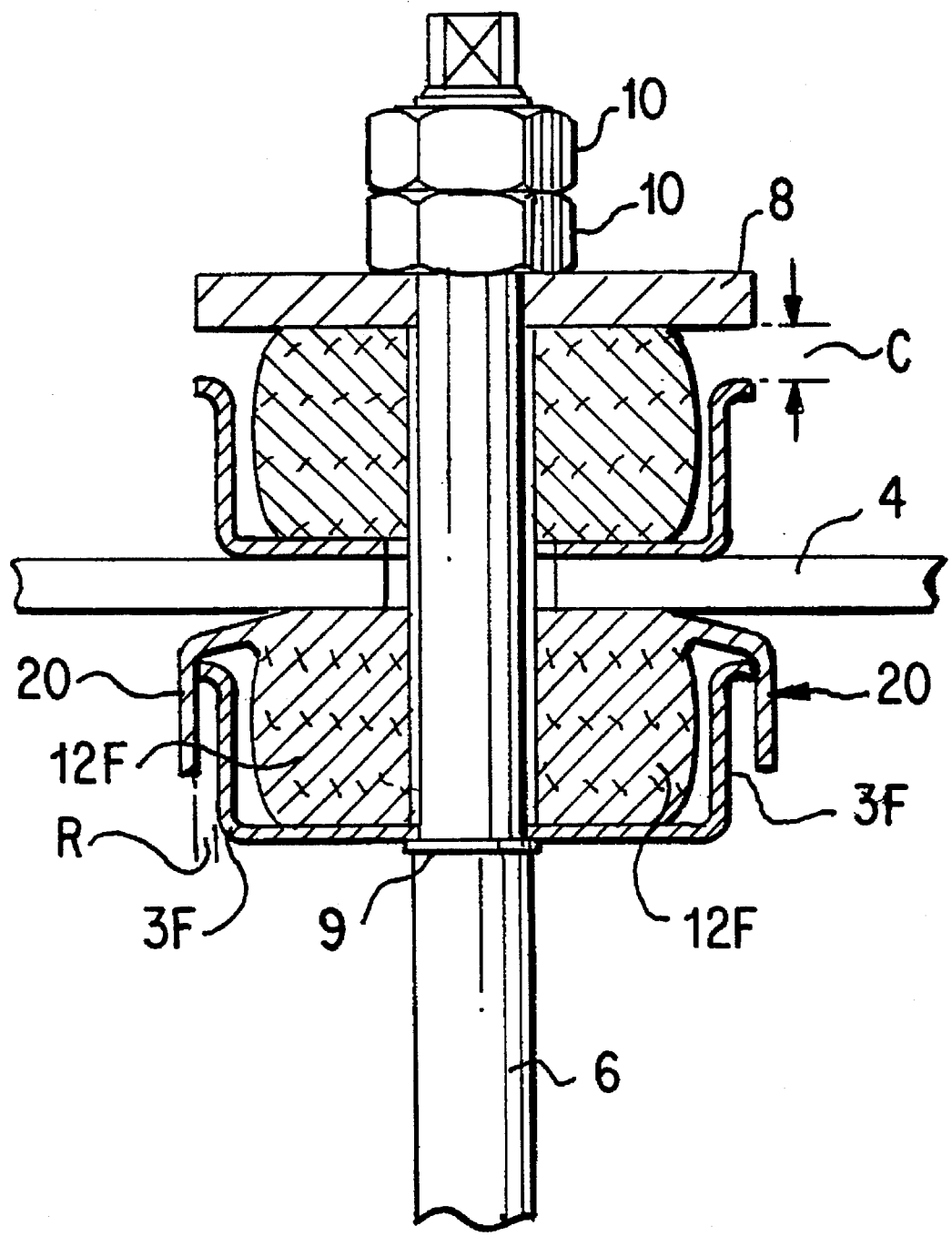
FIG. 8 is a view similar to FIG. 1, showing another preferred embodiment of the invention.

FIG. 8 illustrates an embodiment which is generally similar to the embodiment of FIG. 1, except the lower cup-shaped receptacle 3F is disposed to be upwardly open rather than downwardly open. Receptacle 3F is clampingly engaged from below by flange 9. Alternatively, a plate corresponding to plate 7 of FIG. 1 could be interposed under the receptacle 3F. In either case, the elastic support element 2F is clamped against the bottom of vehicle part 4.

In order to prevent dust and dirt contamination of the free radial gap between the cup walls and the elastic support element 12F, this support element 12F includes an upper cap section with an annular rim section 20 which surrounds and overlaps the cup walls of receptacle 3F, as shown. This cap section with rim section 20 is integrally molded with the remainder of the elastic support element 12F.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Support bearing assembly for supporting first and second automotive vehicle parts with respect to one another, comprising:

a first cup-shaped receptacle disposed at a first side of a first vehicle part, said first cup-shaped receptacle including a first cup bottom and an open first cup rim facing away from the first cup bottom, a second cup-shaped receptacle disposed at a second side of the first vehicle part opposite the first side, said second cup-shaped receptacle including a second cup bottom and an open second cup rim facing away from the second cup bottom, said first vehicle part and said first and second cup bottoms having aligned receiving openings therethrough;

a first elastic support element disposed in the first cup-shaped receptacle;

a second elastic support element disposed in the second cup-shaped receptacle;

said first and second elastic support elements having respective through openings aligned with the receiving openings of the cup bottoms and the first vehicle part;

a central support rod connected to a second vehicle part and penetrating the aligned openings of the first vehicle part, the cup bottoms and the first and second elastic support elements, said central support rod being radially spaced from edges of the aligned openings in the first vehicle part and at least one of the first and second cup bottoms;

a first stop member connected to the support rod and clamping the first elastic support element against the first vehicle part under a preload;

and a second stop member connected to the support rod and clamping the second elastic support element against the first vehicle part under a preload;

wherein the elastic support elements when in an initial mounted position have a radial clearance with respect to cup side walls of the cup-shaped receptacles, which radial clearance is filled by radial expansion of the elastic support elements with consequent increased rigidity of the support bearing assembly during relative movement of the first and second automotive vehicle parts during normal use of the support bearing assembly on a vehicle; and wherein a plurality of support ribs are provided at at least one of the respective cup side walls and the elastic support elements for centering the elastic support elements in the cup-shaped receptacles during their radial expansion during relative movement of the first and second automotive vehicle parts.

2. Support bearing assembly according to claim 1, wherein the support ribs are formed by indentations of the cup side walls of the cup-shaped receptacles.

3. Support bearing assembly according to claim 2, wherein the support ribs extend in the direction of the height of the cup side walls of the cup-shaped receptacles.

4. Support bearing assembly according to claim 1, wherein the support ribs are formed by radially bulged portions of the elastic support elements.

5. Support bearing assembly according to claim 4, wherein the support ribs extend in the direction of the height of the cup side walls of the cup-shaped receptacles.

6. Support bearing assembly according to claim 4, wherein the support ribs of the elastic support elements are formed by a circumferentially extending annular bulge.

7. Support bearing assembly according to claim 1, wherein the support rod is a piston rod of a shock absorber.

8. Support bearing assembly according to claim 1, wherein the first vehicle part is a metallic vehicle frame member.

9. Support bearing assembly according to claim 1, comprising a space sleeve fitting the distance between the first and second stop members.

10. Support bearing assembly according to claim 1, wherein said first cup bottom is fixed to the first side of the first vehicle part, and wherein said second cub bottom is fixed to the second side of the first vehicle part.

11. Support bearing assembly according to claim 10, wherein the support ribs are formed by indentations of the cup side walls of the cup-shaped receptacles.

12. Support bearing assembly according to claim 11, wherein the support ribs extend in the direction of the height of the cup side walls of the cup-shaped receptacles.

13. Support bearing assembly according to claim 10, wherein the support ribs are formed by radially bulged portions of the elastic support elements.

14. Support bearing assembly according to claim 13, wherein the support ribs extend in the direction of the height of the cup side walls of the cup-shaped receptacles.

15. Support bearing assembly according to claim 13, wherein the support ribs of the elastic support elements are formed by a circumferentially extending annular bulge.

16. Support bearing assembly according to claim 10, wherein the first vehicle part is a metallic vehicle frame member.

17. Support bearing assembly according to claim 10, comprising a spacer sleeve fitting the distance between the first and second stop members.

18. Support bearing assembly according to claim 1, wherein said first and second stop members are disk shaped stop members.

19. Support bearing assembly according to claim 1, wherein said first cup-shaped receptacle is an upper cup-shaped receptacle, wherein said first cup bottom is fixed to the first side of the first vehicle part, and wherein said second cup-shaped receptacle is a lower cup-shaped receptacle, wherein said second cup bottom is fixed to a second vehicle part at a side positioned under the first vehicle part, with said second cup rim facing toward the first vehicle part.

20. Support bearing assembly according to claim 19, wherein the support ribs are formed by indentations of the cup side walls of the cup-shaped receptacles.

21. Support bearing assembly according to claim 20, wherein the cap portion is integrally molded with the second elastic support element and includes an annular rim section which circumferentially surrounds and overlaps the cup walls of the lower cup-shaped receptacle.

22. Support bearing assembly according to claim 21, wherein the support rod is a piston rod of a shock absorber.

23. Support bearing assembly according to claim 22, wherein the first vehicle part is a metallic vehicle frame member.

24. Support bearing assembly according to claim 19, wherein the support ribs are formed by radially bulged portions of the elastic support elements.

25. Support bearing assembly according to claim 24, wherein the support ribs extend in the direction of the height of the cup side walls of the cup-shaped receptacles.

26. Support bearing assembly according to claim 19, wherein the support ribs of the elastic support elements are formed by a circumferentially extending annular bulge.

* * * * *